United States Patent
Landsberger et al.

(10) Patent No.: US 9,129,416 B2
(45) Date of Patent: Sep. 8, 2015

(54) DIGITAL ART UNDO AND REDO

(71) Applicant: Microsoft Corporation, Redmond, WA (US)

(72) Inventors: Hans Thomas Landsberger, Greenwich, CT (US); Subha Bhattacharyay, Medina, WA (US); Gerard Zytnicki, Seattle, WA (US); Jeffrey Alan Herold, Kirkland, WA (US); Christopher Shannon Lester, Redmond, WA (US); Ira L. Snyder, Jr., Bellevue, WA (US); John Adam Szofran, Seattle, WA (US); Fan Zhang, Redmond, WA (US); Kaushik Barat, Redmond, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 367 days.

(21) Appl. No.: 13/677,125

(22) Filed: Nov. 14, 2012

(65) Prior Publication Data

US 2014/0132614 A1 May 15, 2014

(51) Int. Cl.
*G09G 5/00* (2006.01)
*G06T 1/60* (2006.01)
*G06T 15/30* (2011.01)
*G06T 11/00* (2006.01)

(52) U.S. Cl.
CPC . *G06T 1/60* (2013.01); *G06T 11/00* (2013.01); *G06T 15/30* (2013.01); *G06T 2210/12* (2013.01)

(58) Field of Classification Search
CPC ............................................ G09G 5/00–5/008
USPC ....................................................... 345/619
See application file for complete search history.

(56) References Cited

U.S. PATENT DOCUMENTS

| | | | |
|---|---|---|---|
| 6,527,812 | B1 | 3/2003 | Bradstreet |
| 7,207,034 | B2 | 4/2007 | Burke et al. |
| 7,548,238 | B2 | 6/2009 | Berteig et al. |
| 2002/0116404 | A1* | 8/2002 | Cha et al. ................. 707/202 |
| 2010/0013843 | A1 | 1/2010 | Ameline |
| 2011/0023052 | A1* | 1/2011 | Huang et al. .............. 719/318 |
| 2013/0120439 | A1* | 5/2013 | Harris et al. .............. 345/619 |

OTHER PUBLICATIONS

"Photoshop / Undo and History", Retrieved on: Oct. 8, 2012, Available at: http://help.adobe.com/en_US/photoshop/cs/using/WSfd1234e1c4b69f30ea53e41001031ab64-749da.html.

"Giliam De Carpentier Game Graphics, Physics and AI", Published on: May 18, 2012, Available at: http://www.decarpentier.nl/scape-brush-pipeline.

Baraglia, et al., "A Parallel Code for Time Independent Quantum Reactive Scattering on CPU-GPU Platforms", In Proceedings of the International Conference on Computational Science and its Applications—vol. Part III, Jun. 20, 2011, pp. 16.

* cited by examiner

*Primary Examiner* — Jacinta M Crawford

(74) *Attorney, Agent, or Firm* — Micah Goldsmith; Judy Yee; Micky Minhas

(57) ABSTRACT

The subject disclosure is directed towards saving undo state information for a digital art program. Changed state data is computed (e.g., via GPU-side logic) based upon the state information of the current state of a canvas and the previous state information, e.g., via an XOR operation or parallel XOR operations. The changed state data is compressed into compressed state data, e.g., via run-length encoding, and the compressed state data is stored, e.g., in a circular buffer in GPU memory. For an undo command, the compressed data is decompressed into the changed state data, and the bitwise operation reversed.

20 Claims, 7 Drawing Sheets

DIGITAL ART UNDO AND REDO

BACKGROUND

"Undo" and "Redo" functionality in a software application allow the user to take back unintended operations (Undo), and then, if desired, undo the Undo operation (Redo). This is a straightforward operation for primarily text entry programs such as a word processing program or spreadsheet program, as the keystrokes and other actions taken by a user (input stimulus) can be queued, with the queued actions reversed for an Undo command or moved forward for a Redo command.

Digital art applications, such as those that digitally paint a canvas/surface, are not as straightforward with respect to Undo and Redo. In general, the nature of the paint operations is such that they interact with (e.g., mix with) existing pixels on the surface and other associated state data. Because of the entropy produced in the paint mixing process, the operations cannot be reversed based on providing an inverted input stimulus.

Instead, the information needed to perform Undo needs to be computed by comparing the "before" and "after" states of the paint operation during the paint process. Simply capturing the states is computationally too expensive in terms of the resources available on contemporary, commercially available computing devices, and even if feasible, would cause users who interact with the paint surface to experience an observable and undesirable delay every time a brushstroke or the like is entered.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards a technology in which undo state information is saved for a digital art program in an efficient way. In one aspect, there is described determining an area of a digital art canvas for which undo state information of a current state is to be saved relative to previous state information. Changed state data is computed for the area based upon the state information of the current state and the previous state information. The changed state data is compressed into compressed state data, and the compressed state data is stored.

In one aspect, a graphics processing unit (GPU) comprising a plurality of cores executes instruction in a GPU-side memory that correspond to GPU-side undo logic. A central processing unit (CPU) executes instruction in a CPU-side memory that correspond to a digital art program and CPU-side undo logic. The GPU-side undo logic is configured to save undo state information for a stroke entered via the digital art program, including being configured to compute changed state data based upon the state information of a current state that includes stroke data representative of the stroke and previous state information.

In one aspect, there is described determining, via GPU-side logic, an area of a digital art canvas for which undo state information of a current state is to be saved relative to previous state information. The GPU-side logic performs one or more XOR operations on the state information of the current state and the previous state information to obtain changed state data. The changed state data is compressed into encoded state data via run-length encoding. The encoded state data may be stored in a circular buffer in GPU-side memory.

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Various aspects of the technology described herein are generally directed towards efficiently computing and saving undo information corresponding to the "before" and "after" states of paint information. In one implementation, the undo information is computed directly on the graphics processing unit (GPU) where the paint operations take place, avoiding delays that otherwise result from copying the information between the central processing unit (CPU) memory space and the GPU memory. The undo information may be compressed, including with lossless compression, to increase the number of Undo steps that can be stored in available memory. Also described is a loosely-coupled coordination between CPU and the GPU, which avoids synchronization delays between the two processors that would otherwise result in an impaired user experience.

It should be understood that any of the examples herein are non-limiting. As such, the present invention is not limited to any particular embodiments, aspects, concepts, structures, functionalities or examples described herein. Rather, any of the embodiments, aspects, concepts, structures, functionalities or examples described herein are non-limiting, and the present invention may be used various ways that provide benefits and advantages in computers and graphics technology in general.

Figure 1:
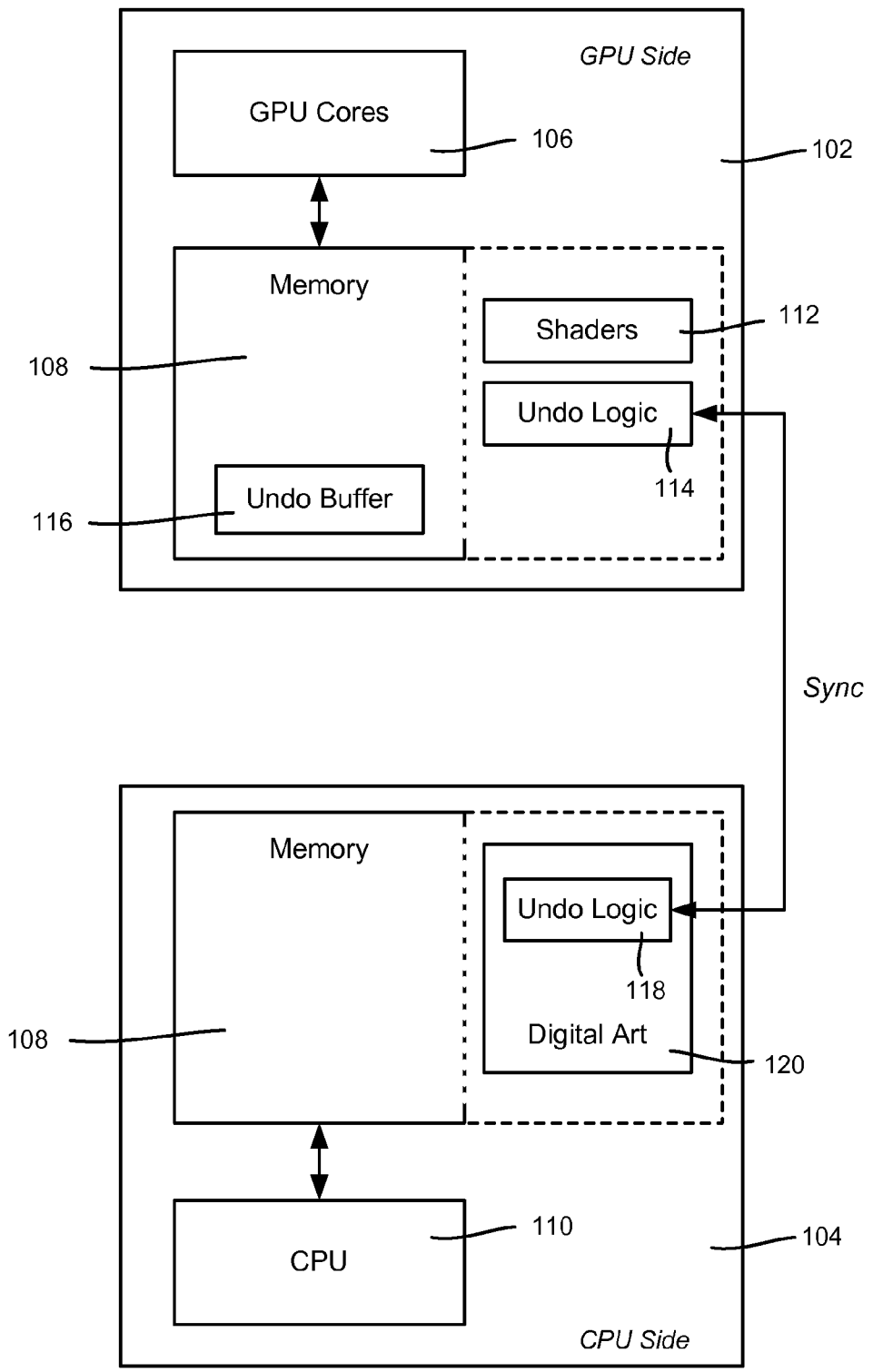
FIG. 1 is a block diagram including GPU-side and CPU-side components configured to save digital art undo state information for use with undo and redo commands, according to one example embodiment.

FIG. 1 shows a block diagram in which a GPU side 102 such as components of a GPU card or integrated graphics component is coupled to a CPU side 104, such as components on a computer motherboard. The GPU side 102 includes a GPU comprising a plurality of GPU cores 106 and GPU memory 108. The CPU side 104 includes a CPU 110 comprising one or more CPU cores. The GPU memory 108 is loaded with shaders 112, undo logic 114 (e.g., program code)

and has reserved therein an undo buffer 116. The CPU memory also includes undo logic 118 (e.g., program code), as part of a digital art program 120. The operation of the GPU undo logic 114 and CPU undo logic 118 is described below.

As mentioned above, taking a snapshot of the canvas "before" state is impractical in terms of computational resources and the amount of delay the user experiences. An alternative approach to a snapshot is to divide the canvas into tiles, track which ones have been altered, and then save Undo snapshots only for them. This approach is simple on the GPU side (needing block copies only), but needs substantial logic on the CPU side to keep track of which tiles have been altered. The space efficiency is also limited, because there is a tradeoff between tile size (smaller minimizes waste) and management overhead (the smaller the tiles, the more of them have to be managed). In addition, this method is not able to detect and eliminate redundancy in the data; (e.g. paint attribute textures often tend to have many adjacent texels with identical values).

Described herein is data reduction (a type of compression) that is directed to storing only what has changed between the before and after state of a canvas. Subtraction is one possible way to store such change information; however, subtraction of a very small floating-point value from a very large one yields a result that is the same as the large value, because of the limited resolution of the numerical format. This loss of information may be avoided by computing the bit difference between the before and after values using the XOR operation. Note that for watercolors, state change can be much more extensive (e.g., pixel colors, state of dryness vector data) than for static media, because change is not confined to the stroke, but is also introduced by the simulation. Lossless compression of floating-point data is unlikely to result in significant space savings.

Figure 2:
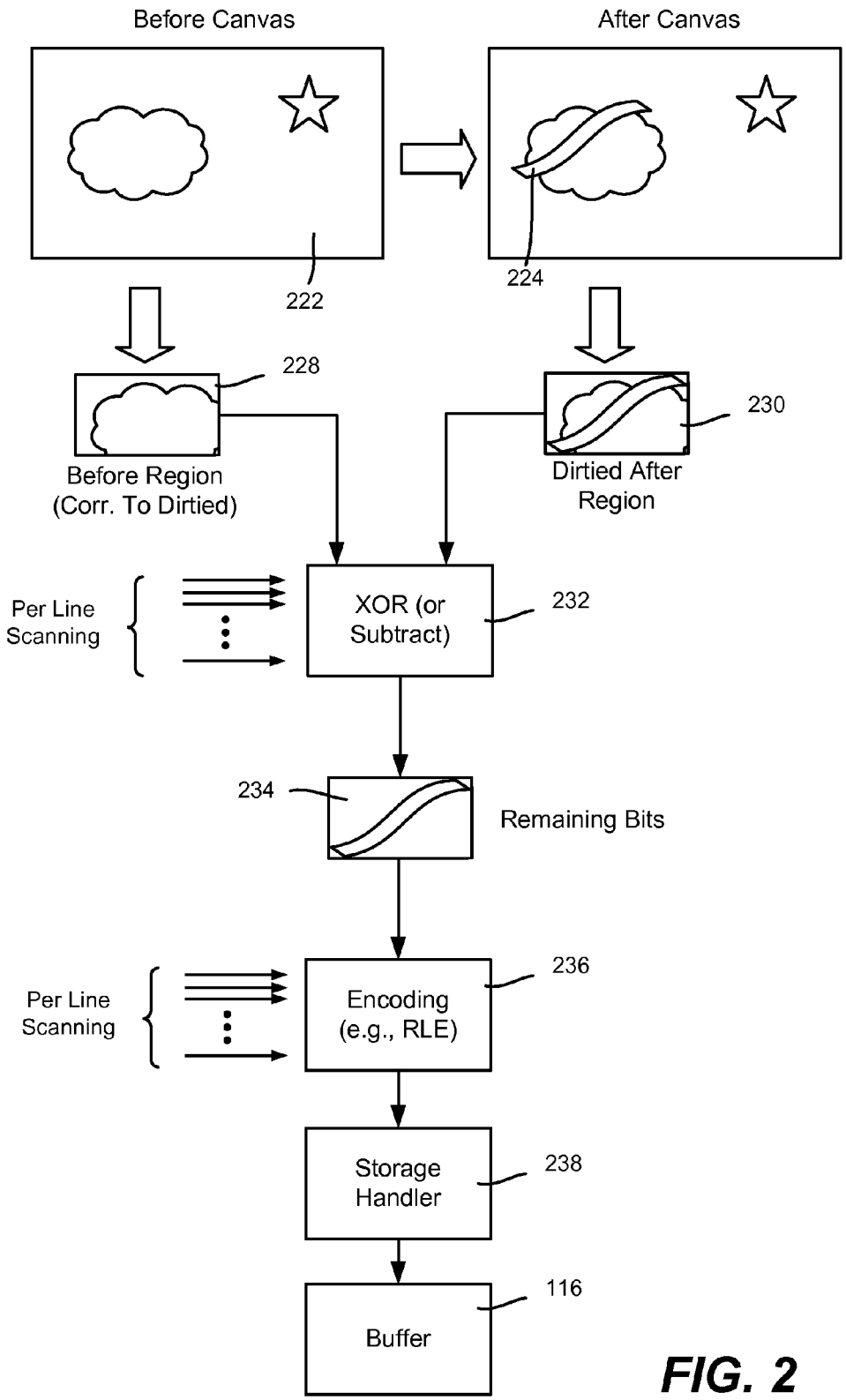
FIG. 2 is a representation of before and after state information being processed into compressed undo information, according to one example embodiment.

FIG. 2 shows an example of how XOR (or any reversible bit operation such as subtraction) data reduction and additional compression may be used (by various parts of the GPU undo logic 114). A before canvas state 222 is modified by a paint stroke 224 or the like, resulting in an after canvas state 224.

It is feasible to use the entire canvas, before and after the stroke for an Undo snapshot. However, because the coordinates of the area "dirtied" by the stroke are known, the region to be saved may be bounded by a rectangle determined from those coordinates. In other words, the XOR operations need not be performed on the entire canvas, but only on the descriptor of the canvas that bounds the changed state data, which is often a smaller rectangle. This provides a more efficient compression operation. Another way is to divide the canvas into a grid, and save regions corresponding to dirtied grids, or draw a bounded box that includes each dirtied grid.

Using such a bounding area, the texture state in the before region 228 (corresponding to the dirtied region) and the texture state in the dirtied region 230 are XOR'ed (block 232). As can be readily appreciated, any unchanged pixels and other associated state result in zeroes following the XOR operation in the remaining bits represented by block 234. As described herein, for efficiency, the various lines of the XOR'ed regions may be scanned in parallel when performing the XOR operations, e.g., by scanning one line per core (thread).

In general, an XOR operation avoids precision issues with floating-point textures. The XOR encoding of differences is content-neutral in that it can be applied to colors, attributes, and so forth, and it can be used for both Undo and Redo. Note that bitwise operations including XOR are not available on some earlier graphics hardware, whereby a lookup table for such hardware may be instead be used.

Note that for improved performance, the CPU undo logic 118 may suppress compression and saving of any Undo information for those GPU textures which are known not to have been altered since the last undo save operation. Examples include the background image when no new image has been loaded, the bottom layer when no dry/fixate command has been issued, or the watercolors-specific textures when no simulation is running. This optimization is orchestrated by the CPU code.

Following XOR bit reduction/compression, a further type of compression compresses the XOR result of corresponding texels in the current and previous texture contents. One such compression technique stores the XOR result using a straightforward run-length encoding (RLE) scheme (block 236 in FIG. 2). While this does not provide as much compression power as a variable-length pattern lookup table may provide, run-length encoding executes much faster on a GPU because there is no searching in global memory.

Compression of texture information means that there is no longer a one-to-one correspondence between input texels and output data. This makes a pixel shader unsuitable for performing the compression, because it cannot suppress output when none is produced. Contemporary GPU cards or the like have compute shaders that are able to perform run length encoding, and also provide a byte address buffer, which helps to store the irregularly sized chunks of compressed data, particularly when selectively written from within a compute shader, using the "unordered access view" on the buffer. For hardware without compute shaders, the CPU is able to be invoked (via the undo logic 118) to perform the run length encoding compression, however this is slower.

With contemporary graphics units, the XOR and encoding operations both may leverage the parallel processing capabilities of the GPU, by breaking the task into smaller units of execution. For example, each line in the changed rectangle may be processed by one GPU core, then run-length encoded as a line for storage. Other alternatives are feasible that tradeoff speed versus compression, e.g., a line may be split into multiple sub-lines, each of which is processed by a core, although with less data to encode, this technique overall does not encode as compactly. Conversely, a core may process more than one line, providing more compression; however there is more data to process per core thus slowing the processing. The amount of storage and the processing speed may be configurable, however for simplicity herein the processing of one scan line per core is described.

As can be seen, in one implementation the process of saving the undo state stores only what has changed, with a compactly encoded working set of information. The information may be compressed, and particularly in a way that is suitable for efficient implementation on a GPU, e.g., run length encoding. Note that common lossless compression technologies like Huffman and Lempel-Ziv involve extensive pattern searching, with branching logic that is very inefficient in GPU code.

With respect to storage, the above run-length encoded data may be saved by a storage handler 238 (part of the GPU undo logic 114) as a compressed chunk for each change. During an operation that saves the undo state data (a SaveUndo operation), in one implementation, the GPU side manages the placement of such compressed chunks autonomously, overwriting the oldest chunks in a circular buffer 116 as needed. Note that this prevents GPU pipeline stalls that would result from querying the GPU immediately after each compression operation.

Figure 3A:
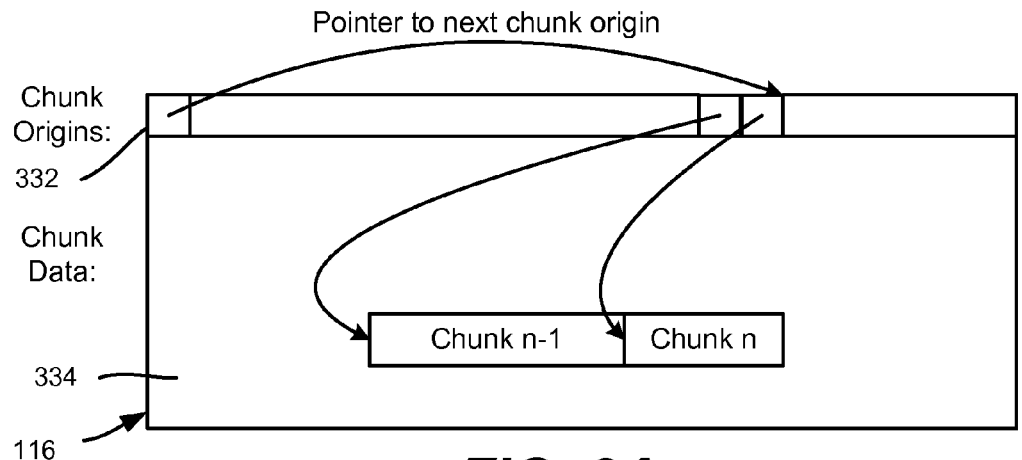
FIGS. 3A-3C are representations of a circular buffer and how chunks of data corresponding to changed stroke information are maintained therein, according to one example embodiment.

In one implementation, generally represented in FIG. 3A, the GPU-side Undo buffer 116 is divided into circular subbuffers, including a small buffer 332 that holds pointers to the origins of the compressed chunks, and a large buffer 334 that holds the chunks. The first entry in the small buffer 332 points to the location where the next origin will be stored, as shown in FIG. 3A (note that the rectangles are not to scale). Note that a single buffer rather than two separate buffers may be used because both need to be written to in the same compute shader passes, and older hardware (e.g., DX10.x with compute shaders) supports only a single UAV (Unordered Access View) target in compute shaders.

The Undo information may be stored as a series of chunks in a single "read-write byte address buffer". In one implementation, each chunk has the following structure:

uint totalSizeOfChunkInBytes
    uint textureWidth
    uint textureHeight
    uint firstLine
    uint lastLine
    uint firstColumn
    uint lastColumn
    uint textureID
    uint sequenceID
    bool fTextureIs8bit
    uint lineOffset[numRows]
    lineInfo[0]
    ...
    lineInfo[numRows−1]
    uint bufferIndexOfHeader LineInfo refers to a stream of entries describing the changes in each line, in sequence, e.g., the run-length encoded data. The offset of each lineInfo item is saved, so that both saving and decompressing can occur using multiple GPU cores processing the data in parallel. The decompression logic computes the length of each lineInfo based on the start of the next lineInfo; for this reason the table contains one additional index at the end for the length of the last line.

An example of this encoding is set forth below, corresponding to a small dab of digital paint that spans three lines, starting in line fifteen (15). The $ symbol is used to denote "buffer index of". Texel size is assumed to be four bytes. The first value of each lineInfo item is a tag which combines type [0=texel string, 1=repeated texel], starting index in the line, and length, into a single unit value. This is followed by one or more texel values:

totalSizeOfChunkInBytes=132
    textureWidth=1920
    textureHeight=1080
    fTextureIs8bit=true
    firstLine=15
    lastLine=17
    firstColumn=0
    lastColumn=1919
    textureID=8
    sequenceID=7
    fTextureIs8bit=1
    lineOffset[numRows]=$lineInfo[0], $lineInfo[1], $lineInfo[2], $lineInfo[2]+2
    lineInfo[0]=tag(0, 125, 5), <5 texel values>
    lineInfo[1]=tag(0, 123, 7), <7 texel values>
    lineInfo[2]=tag(1, 124, 4), <1 texel value to be repeated 4 times>

Figure 4:
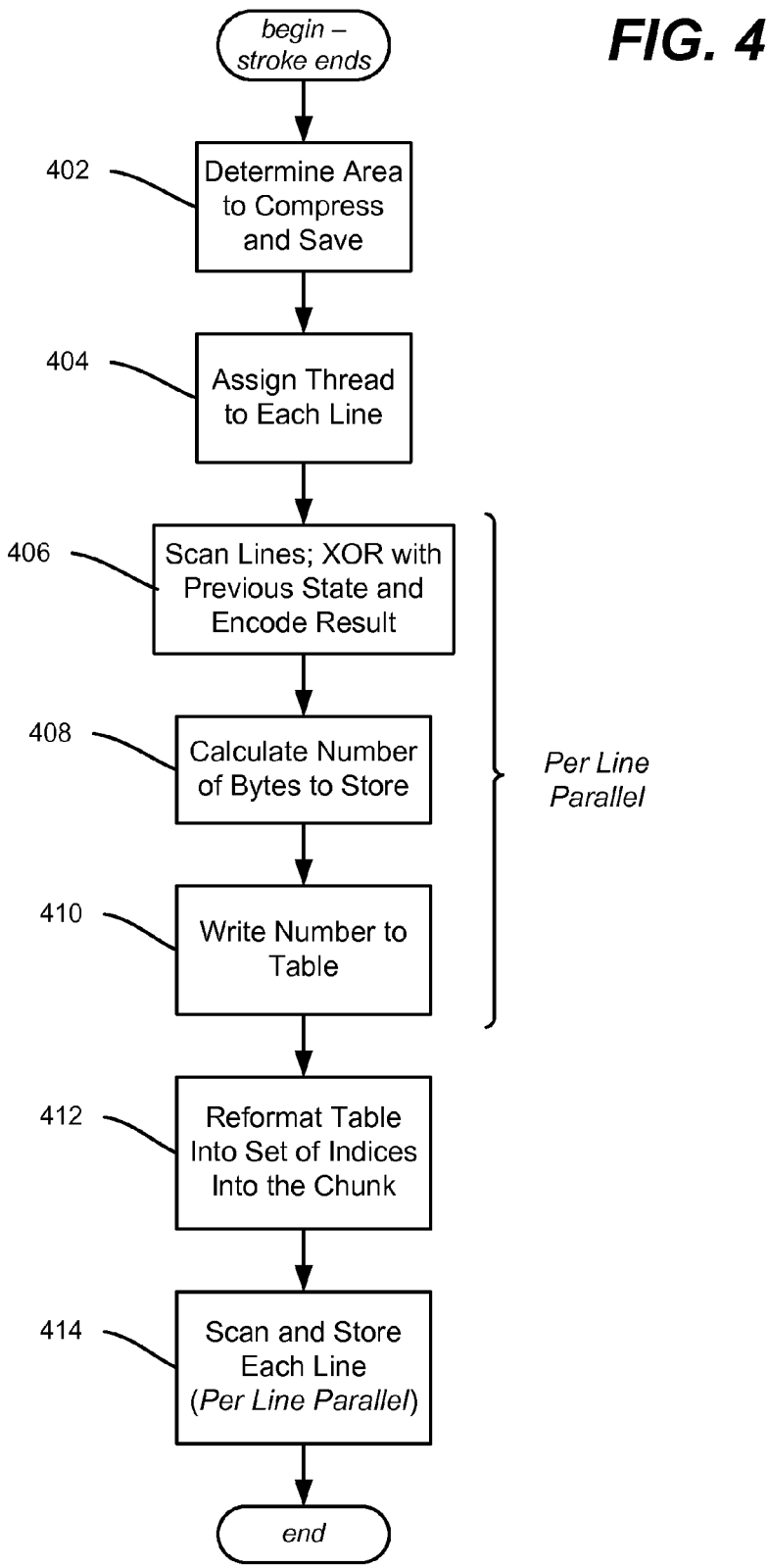
FIG. 4 is a flow diagram representing example steps that may be taken to save changed state information in a compressed encoding format, according to one example embodiment.

FIG. 4 is an example flow diagram showing some example steps of a save state (e.g., SaveUndo) operation, in which a reduced/compressed Undo "snapshot" is taken at the end of each new stroke. Performing the save at the end of the stroke allows using any pause time in the input events to perform the compression, providing less noticeable delay than if taken at the beginning of the next stroke.

In the absence of a watercolors simulation, the area may be limited to be compressed to the bounding rectangle of the stroke, which is tracked during deposition of the paint. This is represented at step 402, where the area to compress and save is determined. For watercolors, any pixel/state that changes in response to the stroke may be included, and the vectors are stored.

In general, the SaveUndo operation is processed texture by texture. The current and previous state of each texture is scanned line by line, encoding only those areas that are that have changed; step 404 assigns a core/thread to each line. As described above, in one implementation the, XOR result for those areas is saved, because the format is content neutral and can be applied in both Undo and Redo directions.

A single core may scan the artwork/bounding rectangle line-by-line and write out the changes in sequence. However, it is faster to utilize multiple GPU cores in parallel, and at the same time not waste any significant data space. The work of the cores is coordinated, so that each core knows where in the chunk to put its information.

Thus, in this example, at step 404 the unit of work assigned to each thread is one line of the canvas (it may be half or a quarter of a line without much of a space penalty, for example, if that yields more efficient thread scheduling). The few elements of the chunk that are not line-related may be written by a separate thread, e.g., thread zero.

In one implementation, the compressed storing of Undo data may be divided into three compute stages, (because under some shader models there is no memory synchronization across threads, whereby the end of shader itself becomes the synchronization mechanism). In a three stage model, the first stage scans (step 406) the texture to perform the XOR and run length encoding, using one thread per line, calculates the total number of bytes to store for each line (step 408), and write that number into a table (step 410). The second stage (step 412) reformats the table into a set of indices into the chunk (blob) that will hold the compressed data. The third stage (step 414) scans the input data once more (one thread per line) and writes the compressed data out to the buffer. As described above, this writing may be performed in parallel because the offsets within the chunk for each line's data are known.

Turning to decompression, in one implementation, the Undo information is compressed using compute shaders. However, earlier compute shaders can sample texture data, but do not support unordered access views on texture buffers. As a result, decompression may occur on the CPU side. To this end, the chunk data is copied into a CPU-side temporary buffer, decompressed to XOR information in a CPU-side staging texture, copied into a GPU-side texture, and applied to the current state of the texture in question to restore its previous state (e.g., using the ApplyXorTransformXY_PS shaders).

Redo follows the same pattern, but applies the XOR information with the roles of current and previous texture state reversed.

Turning to additional aspects related to storage, the buffer 116 may be initialized on the first chunk written to storage, with the chunk origin corresponding to the starting chunk location. Upon writing a chunk, the next chunk origin is set.

To access a chunk in the buffer from the CPU side, to ensure the chunk may be found, the process completes the missing origin and size information in a CPU-side deque of chunk parameters. The process also determines which of the oldest chunks were overwritten (if any), and pops their entries off the deque.

Figure 3B:
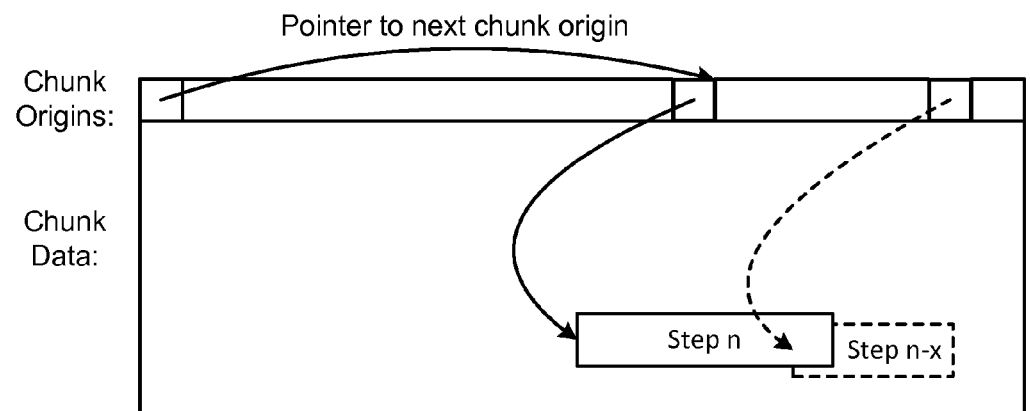

As the Undo buffer is circular, new steps stored by Save-Undo eventually overwrite the oldest steps in the buffer. There is no allocation or deallocation involved, as the old data simply gets overwritten; in FIG. 3B, Step n overwrites part or all of Step n-x; (Step n-x is shown slightly vertically below Step n for purposes of illustration). Note that it is possible for the data to be overwritten multiple times before synchronization with the CPU.

The small sub-buffer holds on the order of 8,000 entries, and is extremely small relative to the large sub-buffer. The buffer size determines how many chunks can be stored autonomously on the GPU side before the process needs to stall the GPU pipeline to synchronize with the CPU. If ten textures are processed for each Undo step, for example, about 800 full Undo steps may be stored before synchronization. Also note that synchronization may occur every time the user performs an Undo.

When synchronization the CPU and GPU information (side stacks) a determination is made as to how much space would be occupied by currently known steps. If this is more than the size of the available buffer space, undo steps are popped of the stack until enough space has been freed up. At that point, all steps referenced in the CPU-side deque of chunks are valid, because the oldest steps are those that were overwritten by newer ones.

Turning to a concept know as a "Dangling Undo Branch," consider an example in which the user has put down five paint strokes, undoes three of them, then puts down another stroke. As in most Undo schemes, the act of putting down a new stroke after an Undo operation causes the digital art program to abandon the three steps that were undone. The information may be kept, but it is not very accessible to users, e.g., undo functionality is customarily implemented as a stack walk, not a tree walk, and to make the branches navigable would necessitate showing the user a map of the tree.

Figure 3C:
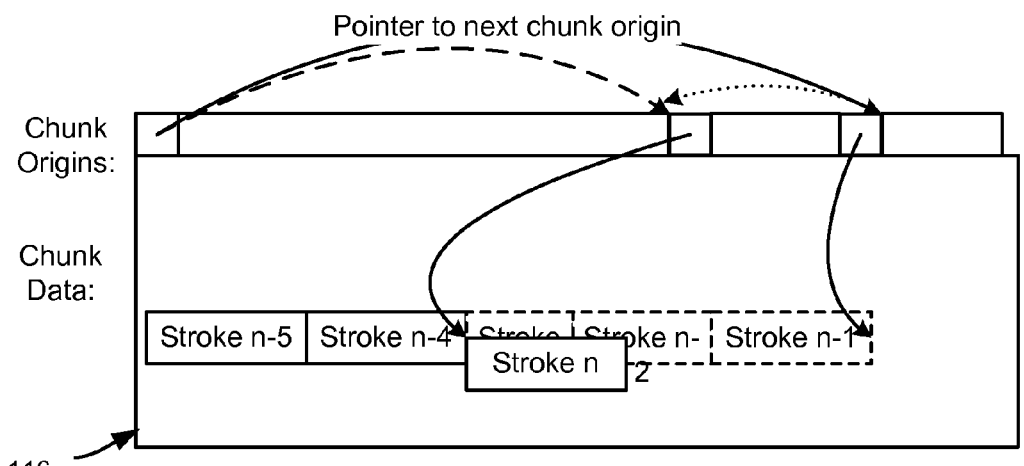

Thus, upon abandoning a dangling branch, the Undo buffer space occupied thereby may be reclaimed to avoid buffer fragmentation. The reclamation is controlled by the CPU side when it executes the SaveUndo command for the stroke that causes the abandonment. Reclaiming is accomplished by instructing the compute shader to reset the pointer to the next chunk origin at the very start of the Undo buffer; (after an Undo operation, the CPU side has the information about the layout of chunks in the buffer). This is generally represented in FIG. 3C, where the stroke n chunk is written to where the stroke n−3 chunk was previously stored, and the pointer adjusted.

The Undo buffer is the largest object that the undo logic allocates in GPU memory space, and its size affects performance. If the GPU runtime needs to overcommit GPU memory, the resulting paging slows down the Undo performance noticeably, whereby the number of available Undo steps that are maintained are traded off against deposition performance.

One implementation chooses the minimal Undo buffer size possible, namely enough space to store the contents of one set of worst-case texture deltas; (corresponding to every texel across the entire canvas area being assumed to have changed, and the change patterns are such that there is minimal run-length compression). In effect, this is a worst case drying operation (which affects all textures) covering the entire canvas. If such an operation occurs, all pre-existing Undo steps are dropped, but the information needed to Undo the worst case (e.g., drying) fits completely in the buffer. An analogous computation is performed in when the buffer is enlarged to accommodate additional textures, e.g. for watercolors.

The actual number of available Undo steps at any given point in time varies with the memory requirements for each step. Large changes require large Undo snapshots, but for typical oil or pastel strokes, on the order of one-hundred strokes may be stored.

Figure 5:
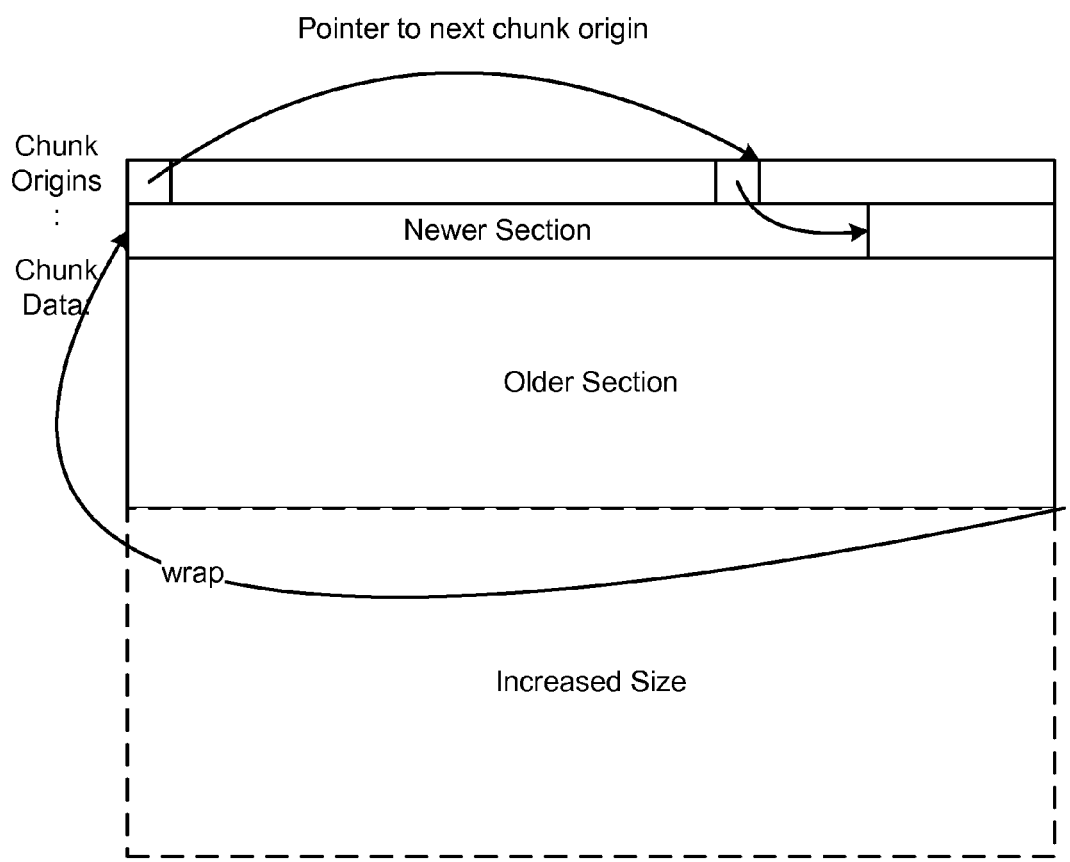
FIGS. 5 and 6 are representations of how a circular buffer may be increased in size to accommodate additional undo state information, according to one example embodiment.

When the watercolors simulation is active, the snapshots are particularly large due to the amount of simulation state information to be saved. Because the Undo buffer is sized based on the number and size of the active textures, the buffer needs to be enlarged when watercolors are turned on. When this takes place, the currently stored Undo steps need to be preserved when the new buffer is allocated, which occurs by copying the old content to the new buffer. However, this needs to be done this in a rearranged form, otherwise the data would wrap somewhere in the middle rather than at the end. Size increasing is generally represented in FIG. 5.

Figure 6:
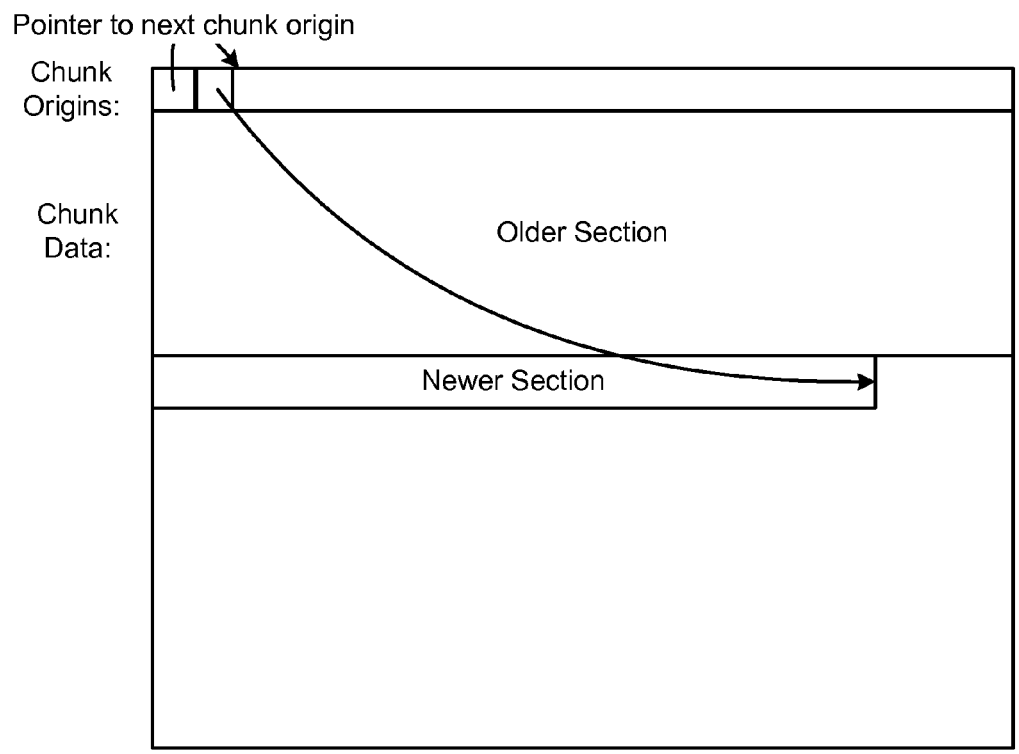

In the re-arranged new buffer the content initially does not wrap, but new steps can be appended to the end in a logical fashion. This is generally represented in FIG. 6.

Note that whenever a new Undo buffer is allocated, a dummy read operation may be performed on it, which forces the graphics runtime to perform the actual allocation in GPU memory space, which can take a noticeable amount of time. The dummy read avoids having the delay occur right after the first paint stroke, when the first SaveUndo is executed.

Example Operating Environment

Figure 7:
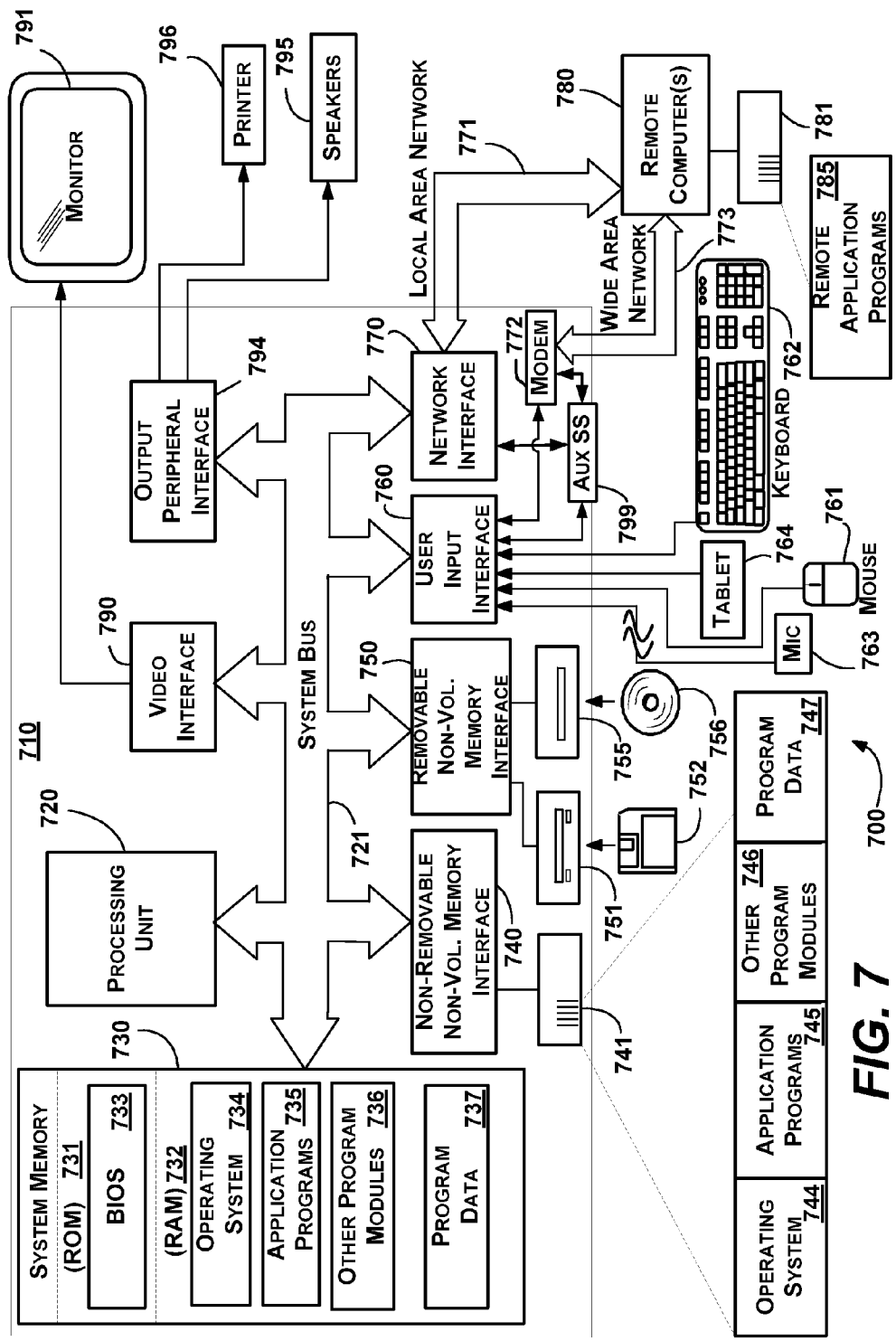
FIG. 7 is a block diagram representing an example computing environment into which aspects of the subject matter described herein may be incorporated.

FIG. 7 illustrates an example of a suitable computing and networking environment 700 into which the examples and implementations of any of FIGS. 1-6 may be implemented, for example. The computing system environment 700 is only one example of a suitable computing environment and is not intended to suggest any limitation as to the scope of use or functionality of the invention. Neither should the computing environment 700 be interpreted as having any dependency or requirement relating to any one or combination of components illustrated in the example operating environment 700.

The invention is operational with numerous other general purpose or special purpose computing system environments or configurations. Examples of well known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 7, an example system for implementing various aspects of the invention may include a general purpose computing device in the form of a computer 710. Components of the computer 710 may include, but are not limited to, a processing unit 720, a system memory 730, and a system bus 721 that couples various system components including the system memory to the processing unit 720. The system bus 721 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 710 typically includes a variety of computer-readable media. Computer-readable media can be any available media that can be accessed by the computer 710 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 710. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above may also be included within the scope of computer-readable media.

The system memory 730 includes computer storage media in the form of volatile and/or nonvolatile memory such as read only memory (ROM) 731 and random access memory (RAM) 732. A basic input/output system 733 (BIOS), containing the basic routines that help to transfer information between elements within computer 710, such as during start-up, is typically stored in ROM 731. RAM 732 typically contains data and/or program modules that are immediately accessible to and/or presently being operated on by processing unit 720. By way of example, and not limitation, FIG. 7 illustrates operating system 734, application programs 735, other program modules 736 and program data 737.

The computer 710 may also include other removable/non-removable, volatile/nonvolatile computer storage media. By way of example only, FIG. 7 illustrates a hard disk drive 741 that reads from or writes to non-removable, nonvolatile magnetic media, a magnetic disk drive 751 that reads from or writes to a removable, nonvolatile magnetic disk 752, and an optical disk drive 755 that reads from or writes to a removable, nonvolatile optical disk 756 such as a CD ROM or other optical media. Other removable/non-removable, volatile/nonvolatile computer storage media that can be used in the example operating environment include, but are not limited to, magnetic tape cassettes, flash memory cards, digital versatile disks, digital video tape, solid state RAM, solid state ROM, and the like. The hard disk drive 741 is typically connected to the system bus 721 through a non-removable memory interface such as interface 740, and magnetic disk drive 751 and optical disk drive 755 are typically connected to the system bus 721 by a removable memory interface, such as interface 750.

The drives and their associated computer storage media, described above and illustrated in FIG. 7, provide storage of computer-readable instructions, data structures, program modules and other data for the computer 710. In FIG. 7, for example, hard disk drive 741 is illustrated as storing operating system 744, application programs 745, other program modules 746 and program data 747. Note that these components can either be the same as or different from operating system 734, application programs 735, other program modules 736, and program data 737. Operating system 744, application programs 745, other program modules 746, and program data 747 are given different numbers herein to illustrate that, at a minimum, they are different copies. A user may enter commands and information into the computer 710 through input devices such as a tablet, or electronic digitizer, 764, a microphone 763, a keyboard 762 and pointing device 761, commonly referred to as mouse, trackball or touch pad. Other input devices not shown in FIG. 7 may include a joystick, game pad, satellite dish, scanner, or the like. These and other input devices are often connected to the processing unit 720 through a user input interface 760 that is coupled to the system bus, but may be connected by other interface and bus structures, such as a parallel port, game port or a universal serial bus (USB). A monitor 791 or other type of display device is also connected to the system bus 721 via an interface, such as a video interface 790. The monitor 791 may also be integrated with a touch-screen panel or the like. Note that the monitor and/or touch screen panel can be physically coupled to a housing in which the computing device 710 is incorporated, such as in a tablet-type personal computer. In addition, computers such as the computing device 710 may also include other peripheral output devices such as speakers 795 and printer 796, which may be connected through an output peripheral interface 794 or the like.

The computer 710 may operate in a networked environment using logical connections to one or more remote computers, such as a remote computer 780. The remote computer 780 may be a personal computer, a server, a router, a network PC, a peer device or other common network node, and typically includes many or all of the elements described above relative to the computer 710, although only a memory storage device 781 has been illustrated in FIG. 7. The logical connections depicted in FIG. 7 include one or more local area networks (LAN) 771 and one or more wide area networks (WAN) 773, but may also include other networks. Such networking environments are commonplace in offices, enterprise-wide computer networks, intranets and the Internet.

When used in a LAN networking environment, the computer 710 is connected to the LAN 771 through a network interface or adapter 770. When used in a WAN networking environment, the computer 710 typically includes a modem 772 or other means for establishing communications over the WAN 773, such as the Internet. The modem 772, which may be internal or external, may be connected to the system bus 721 via the user input interface 760 or other appropriate mechanism. A wireless networking component 774 such as comprising an interface and antenna may be coupled through a suitable device such as an access point or peer computer to a WAN or LAN. In a networked environment, program modules depicted relative to the computer 710, or portions thereof, may be stored in the remote memory storage device. By way of example, and not limitation, FIG. 7 illustrates remote application programs 785 as residing on memory device 781. It may be appreciated that the network connections shown are examples and other means of establishing a communications link between the computers may be used.

An auxiliary subsystem 799 (e.g., for auxiliary display of content) may be connected via the user interface 760 to allow data such as program content, system status and event notifications to be provided to the user, even if the main portions of the computer system are in a low power state. The auxiliary subsystem 799 may be connected to the modem 772 and/or network interface 770 to allow communication between these systems while the main processing unit 720 is in a low power state.

CONCLUSION

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. In a computing environment, a method performed at least in part on at least one processor, the method comprising:
   determining an area of a digital art canvas for which undo state information of a current state is to be saved relative to previous state information by setting a bounding box on the digital art canvas that includes stroke data associated with a stroke input that changes the previous state information to a state information of the current state;
   dividing the bounding box into a plurality of grids and selecting grids from the plurality of grids that include the stroke data that changed the previous state information to the state information of the current state and performing an XOR operation between bits representing the state information of the current state within the selected grids and bits representing the previous state information within the selected grids;
   computing changed state data for the bounding box based upon the performed XOR operation;
   compressing the changed state data into compressed state data; and
   storing the compressed state data.

2. The method of claim 1 wherein storing the compressed state data comprises storing the compressed state data during a pause time in the stroke input.

3. The method of claim 1 wherein computing the changed state data comprises performing a subtraction.

4. The method of claim 1 wherein compressing the changed state data into compressed state data comprises run length encoding the changed state data.

5. The method of claim 1 wherein performing the XOR operation comprises performing a plurality of parallel XOR operations between the bits representing the state information of the current state within the selected grids and the bits representing the previous state information within the selected grids.

6. The method of claim 5 wherein compressing the changed state data into compressed state data comprises performing a plurality of parallel run length encodings of the changed state data.

7. The method of claim 6, wherein compressing the changed state data into compressed state data comprises performing a plurality of parallel run length encodings of the changed state data, and wherein each of the plurality of parallel XOR operations and each of the plurality of parallel run length encodings are performed by a graphics processing unit (GPU) core.

8. The method of claim 1 wherein storing the compressed state data comprises storing the compressed state data on GPU memory.

9. The method of claim 8 further comprising, synchronizing information representative of information in the GPU memory with central processing unit-side (CPU-side) logic.

10. The method of claim 1 further comprising, in response to an undo command, decompressing the compressed data into the changed state data, and restoring the previous state information based upon the changed state data.

11. The method of claim 10 further comprising, in response to a redo command following the undo command, undoing the undo command.

12. The method of claim 1, wherein computing the changed state data comprises computing the changed state data via a reversible bit-wise operation.

13. The method of claim 12, wherein the reversible bit-wise operation is performed by at least one compute shader of the GPU core.

14. A system comprising:
   a graphics processing unit (GPU) comprising a plurality of cores and a GPU-side memory, the GPU-side memory containing instructions that when executed on the GPU correspond to GPU-side undo logic;
   a central processing unit (CPU) and a CPU-side memory, the CPU memory containing instructions that when executed on the CPU correspond to a digital art program and CPU-side undo logic; and
   the GPU-side undo logic configured to save undo state information for a stroke entered via the digital art program by:
      determining an area of a digital art canvas for which the undo state information of a current state is to be saved relative to previous state information by setting a bounding box on the digital art canvas that includes stroke data associated with the stroke that changes the previous state information to a state information of the current state; dividing the bounding box into a plurality of grids and selecting grids from the plurality of grids that include stroke data that changed the previous state information to the state information of the current state and performing an XOR operation between bits representing the state information of the current state within the selected grids and bits representing the previous state information within the selected grids;
      computing changed state data for the bounding box based upon the performed XOR operation; and
      storing the computed changed state data.

15. The system of claim 14 wherein the GPU-side undo logic is configured to save the undo state information at the end of the stroke.

16. The system of claim 14 wherein the GPU-side undo logic computes the changed state data via a reversible bitwise operation, the GPU-side undo logic further configured to compress the changed state data into encoded data that is saved as the undo state information.

17. The system of claim 16 wherein the reversible bitwise operation and the encoding operation are performed by at least one compute shader of the GPU-side.

18. The system of claim 17 wherein the reversible bitwise operation comprise the XOR operation, wherein the encoded data comprises run-length encoded data, and wherein performing the XOR operation comprises performing a plurality of parallel XOR operations by the GPU-side undo logic to obtain the changed state data, and wherein a plurality of parallel run-length encoding operations are performed by the GPU-side undo logic to compress the changed state data.

19. One or more computer storage media storing computer-executable instructions, which when executed perform operations, comprising:
- determining, via graphics processing unit- (GPU-) side logic, an area of a digital art canvas for which undo state information of a current state is to be saved relative to previous state information by setting a bounding box on the digital art canvas that includes stroke data associated with a stroke input that changes the previous state information to a state information of the current state;
- dividing the bounding box into a plurality of grids and selecting grids from the plurality of grids that include the stroke data that changed the previous state information to the state information of the current state;
- performing, via the GPU-side logic, one or more XOR operations between bits representing the state information of the current state within the selected grids and bits representing the previous state information within the selected grids;
- computing changed state data for the bounding box based on the performed one or more XOR operations;
- run-length encoding the changed state data into encoded state data; and
- storing the encoded state data in a circular buffer in GPU-side memory.

20. The one or more computer storage media of claim 19 wherein run-length encoding the changed state data into the encoded state data is performed via the GPU-side logic, and wherein performing the one or more XOR operations, run-length encoding the changed state data into encoded state data, and storing the encoded state data comprise dividing the area into a plurality of sets of data corresponding to processing tasks, and parallel processing the processing tasks with a plurality of GPU cores.

* * * * *